Figure 1:
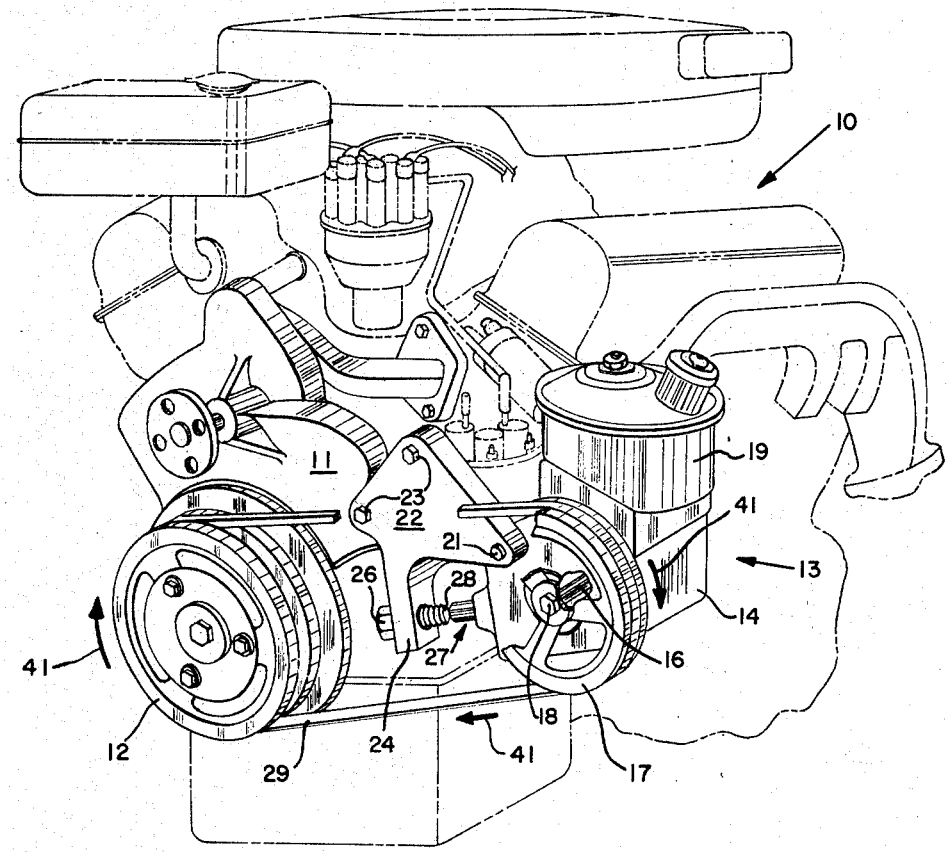

May 12, 1964 F. R. DINGER 3,132,596
BELT TENSIONING MEANS

Filed Aug. 28, 1961 2 Sheets-Sheet 1

FREDERICK R. DINGER
*INVENTOR.*

BY *John R. Faulkner*
*Thomas H. Oster*
ATTORNEYS

May 12, 1964  F. R. DINGER  3,132,596
BELT TENSIONING MEANS
Filed Aug. 28, 1961  2 Sheets-Sheet 2

FREDERICK R. DINGER
INVENTOR.

BY John R. Faulkner
Thomas H. Oster
ATTORNEYS

United States Patent Office 3,132,596
Patented May 12, 1964

3,132,596
BELT TENSIONING MEANS
Frederick R. Dinger, Dearborn Township, Wayne County, Mich., assignor to Ford Motor Company, Dearborn, Mich., a corporation of Delaware
Filed Aug. 28, 1961, Ser. No. 136,390
11 Claims. (Cl. 103—212)

This invention relates to a belt tensioning means. More specifically the invention relates to an arrangement wherein the output pressure of a belt operated pump is used to position the pump about a pivot and provide increased tension on the belt during high torque output requirements.

Many of the present day motor vehicles have belt driven accessories, particularly power steering pumps. Power steering pumps, for example, are subjected to intermittent high torque requirements. An example of a high torque requirement situation occurs when the motor vehicle is in a standing position and the wheels are cranked to one side. This situation occurs normally when the motor vehicle is parked.

On the other hand, power steering pumps are subjected to relatively low torque requirements when the vehicle is in motion and slight steering deviation is made. Because of the high torque requirements required during the intermittent and relatively infrequent occasions, it is now necessary from time to time to adjust the belt to prevent slippage and accelerated belt wear. If the belt is tensioned for the extreme high torque condition, excessive belt and bearing wear and belt stretch often take place.

A number of devices have been proposed to maintain proper belt tension. Split pulley types, for example, will place the proper tension on the belt but will result in accelerated belt wear. Spring biased pump supports have also been used. These devices, however, generally result in excessive pump vibration.

In an embodiment of this device, a power steering pump is pivotally mounted upon an internal combustion engine. The power steering pump is provided with a hydrostatic snubber which is in communication with the output pressure side of the power steering pump at one end and in contact with a stationary bracket on the internal combustion engine at the other end. As the required operating torque increased, the pump output pressure increased. The hydrostatic snubber was forced outwardly by the power steering pump output pressure against the stationary bracket pivotally moving the pump away from the stationary bracket and placing a greater tension on the belt.

When the pump output pressure described, the hydrostatic snubber retracted into the pump and the belt tension was lessened. Means may also be provided in the snubber to avoid excessive belt looseness as well as excessive belt tautness as a result of a marked decrease and/or increase in pump pressure.

Attempts have been made in non-analogous fields to utilize the output of a device to tighten a belt. For example, in U.S. Letters Patent 1,730,319, issued on October 1, 1929, to J. J. Dilks, Jr., the air compressor output pressure is used to slide the electric motor which powers the compressor in a direction that increases belt tension.

One of the primary objects of this invention is to provide an automatic belt tensioner.

Still a further object of this invention is to provide a belt driven pump of a variable pressure output wherein the output pressures of the pump are used to automatically position the pump in a manner to effect a proper tension on the belt driving the pump.

Still a further object of this invention is to provide a pivotally mounted belt driven power steering pump upon an internal combustion engine wherein an increase in the output pressure of the pump is used to pivot the power steering pump in a direction to increase the tension of the belt on the belt.

Figure 2:
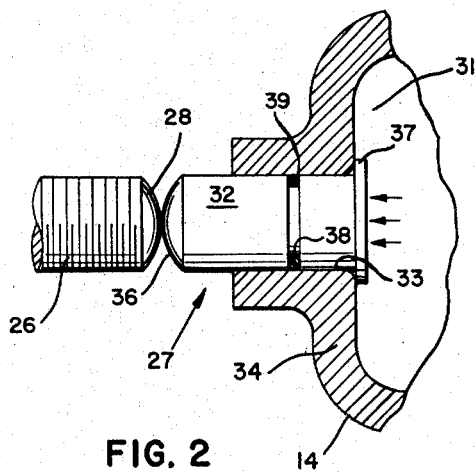
Figure 5:
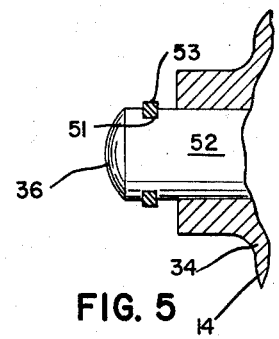
Figure 3:
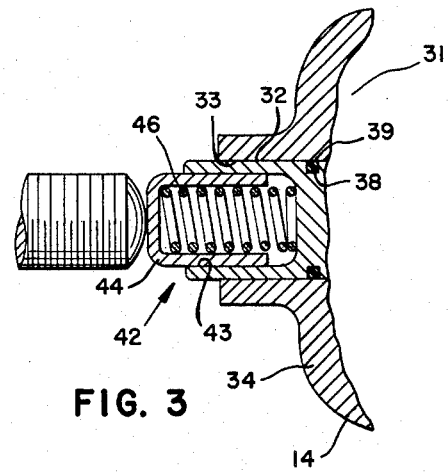
Figure 4:
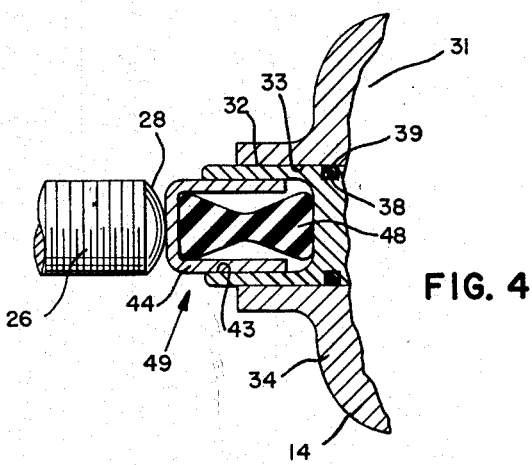

Other objects and advantages of this invention will become more apparent when considered in connection with the accompanying drawings, wherein:

FIGURE 1 is a front elevational view of an internal combustion engine partly in phantom and embodying the invention, and FIGURE 2 is a fragmentary enlarged sectional view of the hydrostatic snubber, and FIGURES 3 and 4 are fragmentary enlarged sectional views of alternate forms of the hydrostatic snubber and embodying means for preventing damage to the belt, and FIGURE 5 is an enlarged sectional view of an alternate form of the hydrostatic snubber that embodies means for preventing excessive looseness in the belt.

Referring now to the drawings and in particular FIGURE 1, an internal combustion engine is indicated at 10. Internal combustion engine 10 is provided with a front cover 11 and a crankshaft driven pulley 12.

The power steering pump unit is indicated at 13 and is provided with the usual pump body assembly 14 having a power steering pump shaft 16 to which the power steering pump pulley 17 is mounted upon and secured to the power steering pump shaft 16 by bolt 18 for rotation therewith. A reservoir 19 is mounted atop the pump body assembly 14.

The power steering pump unit 13 is pivotally mounted by bolt 21 to a bracket 22 which is attached to the internal combustion engine front cover 11 by bolts 23. Pivot bolt 21 is mounted eccentric to the shaft 16 and parallel thereto. It is to be further noted that the weight of the power steering pump unit is off-center and to the right of the pivot bolt 21 when looking at FIGURE 1 of the drawings.

Bracket 22 is provided with a flange 24 through which an adjusting bolt 26 extends. A hydrostatic snubber 27 projects from the power steering pump body assembly 14 and engages the projecting end 28 of the adjusting bolt 26.

The crankshaft pulley 12 and the power steering pump pulley 17 are connected by a belt 29. The drive is from the crankshaft pulley 12, through the belt 29, to the power steering pump pulley 17. The detail structure of the power steering unit 13 is conventional in detail except for the use of the snubber 27.

Referring now to FIGURE 2, the power steering pump body assembly 14 is conventionally provided with an outlet side or cavity of the pump downstream of the pumping mechanism. This outlet side or cavity may be indicated in part by reference numeral 31. The hydrostatic snubber 27 is in the form of a piston having a cylindrical body 32 slidably received in bore 33 in the power steering pump body 34. Hydrostatic snubber 27 is further provided with a rounded projecting end 36 and an enlarged shoulder 37. Shoulder 37 is located on the inside of the power steering pump body 34 and the cavity 31. The outward movement of the hydrostatic snubber 27 is stopped when the shoulder 37 contacts the power steering pump body 34 adjacent to the bore 33. In the event of belt failure, there will be no loss of pump fluid.

One or more annular grooves 38 also may be provided in the cylindrical body 32 or the receival of O-rings 39 which seal the hydrostatic snubber cylindrical body 32 in the bore 33.

The rounded projecting end 36 of hydrostatic snubber 27 is adapted to engage the projecting end 28 of the adjusting bolt 26. In the initial adjustment the adjusting bolt 26 may be set to position the power steering pump unit 13 about the pivot bolt 21 in order to place a moderate tension on the belt 29.

In actual operation the crankshaft pulley 12 is rotating in the direction indicated by the arrows 41. Belt 29 is, of course, driving the power steering pump pulley 17 in the same direction. The power steering pump output is moderate, for example, during a standing position with the engine at idle. If the wheels are subsequently cranked to one side under these circumstances, the power steering pump will be subjected to an extremely high torque. The power steering pump output pressure increases substantially in the cavity 31 thereby forcing the hydrostatic snubber 27 to be pushed outwardly against the projecting end 28 of the adjusting bolt 26. This outward movement of the hydrostatic snubber 27 in response to the increasing pump output pressure results in the pivotal movement of the power steering pump unit 13 about the pivot bolt 21 to the left as looking at FIGURE 1. Increased tension on the belt 29 is immediately effected.

When the high output power steering pump pressures pass, the pump output pressure in the cavity 31 will, of course, decrease and the hydrostatic snubber 27 will move axially inwardly thereby lessening the belt tension.

FIGURES 3 and 4 show alternate forms of hydrostatic snubbers. In the event that the instantaneous high power steering pump output pressure may be high enough to cause damage to the belt 29 because of overstretching, it is possible to embody safety means for limiting the amount of tension that may be placed on the belt 29 at any one time.

Referring to FIGURE 3 specifically, the hydrostatic snubber assembly is indicated at 42. Hydrostatic snubber 42 likewise has the cylindrical body portion 32, annular groove 38 and O-ring 39. The portion of the snubber, however, which engages the projecting end 28 of bolt 26 is changed by providing a cylindrical bore 43. Cylindrical bore 43 slidably receives a cap 44. A spring 46 is positioned between the cap 44 and the bore 43. Under normal conditions the spring would maintain the parts in the position shown in FIGURE 3. However, if the instantaneous power steering pump output pressure became high enough to cause damage to the belt, the spring would be compressed thereby resulting in an immediate lessening of tension on the belt.

In FIGURE 4 the hydrostatic snubber assembly 47 is shown which is similar to the structure of hydrostatic snubber assembly 42. In place of the spring 46, however, there is disposed an elastomer bumper 48. During movements of excessive power steering pump output pressures, the bumper 48 will deform sufficiently so that a lessening of the belt tension will take place.

In FIGURE 5, the hydrostatic snuubber 49 is provided with means that prevent excessive looseness in the belt 29. An annular groove 51 may be provided in the cylindrical body 52 adjacent to the rounded projecting end 36 and a split washer 53 inserted therein. If for some reason the output pressure of the pump falls below a certain value, there will not be a complete loosening of the belt.

It will be understood that the invention is not to be limited to the exact construction shown and described but that various changes and modifications may be made without departing from the spirit and scope of the invention as defined in the appended claims.

I claim:

1. A belt tensioning device and fluid pump comprising a pump having a drive shaft, a pulley affixed for rotation with said drive shaft, a belt for driving said pulley, means supporting said pump for pivotal movement about an axis parallel to and spaced from the axis of said drive shaft, a fixed abutment spaced from the pivot axis of said pump, and a hydrostatic snubber having a first portion in engagement with said abutment and a second portion, pressure transmitting means for transmitting at least a portion of the output pressure of said pump to said second portion for pivotally moving said pump to change the tension on said belt.

2. A belt tensioning device and fluid pump comprising a pump having a drive shaft, a pulley affixed for rotation with said drive shaft, a belt for driving said pulley, means supporting said pump for pivotal movement about an axis parallel to and spaced from the axis of said drive shaft, a fixed abutment spaced from the pivot axis of said pump, a hydrostatic snubber having a portion in engagement with said abutment and a second portion, pressure transmitting means for transmitting at least a portion of the output pressure of said pump to said second portion for pivotally moving said pump to change the tension on said belt, and motion limiting means for said hydrostatic snubber to limit its degree of movement in at least one direction.

3. An integral belt tensioning device and fluid pump comprising a pump having a body portion with a cavity therein in communication with the pump discharge, a drive shaft for said pump rotatably supported in said body portion, a pulley fixed for rotation with said drive shaft, a belt for driving said pulley, means supporting said pump for pivotal movement about an axis spaced from and parallel to said drive shaft, a fixed abutment spaced from the pivot axis of said pump, a bore in said pump body portion communicating with said cavity and terminating adjacent said fixed abutment, and a hydrostatic snubber reciprocally received in said bore and having an end portion adapted to engage said abutment for pivotally moving said pump to change the tension on said belt with variations in the discharge pressure of said pump.

4. An integral belt tensioning device and fluid pump comprising a pump having a body portion with a cavity therein in communication with the pump discharge, a drive shaft for said pump rotatably supported in said body portion, a pulley fixed for rotation with said drive shaft, a belt for driving said pulley, means supporting said pump for pivotal movement about an axis spaced from and parallel to said drive shaft, a fixed abutment spaced from the pivot axis of said pump, a bore in said pump body portion communicating with said cavity and terminating adjacent said fixed abutment, a hydrostatic snubber reciprocally received in said bore and having an end portion adapted to engage said abutment for pivotally moving said pump to change the tension on said belt with variations in the discharge pressure of said pump, and means on said hydrostatic snubber cooperating with means on said pump to limit the movement of said hydrostatic snubber in at least one direction.

5. An integral belt tensioning device and fluid pump comprising a pump having a body portion with a cavity therein communicating with the pump discharge, a drive shaft for said pump rotatably supported in said body portion, a pulley fixed for rotation with said drive shaft, a belt for driving said pulley, means supporting said pump for pivotal movement about an axis spaced from and parallel to said drive shaft, a fixed abutment spaced from the pivot axis of said pump, a bore in said pump body portion communicating with said cavity and terminating adjacent said fixed abutment, a hydrostatic snubber reciprocally received in said bore and having an end portion adapted to engage said abutment for pivotally moving said pump to change the tension on said belt with variations in the discharge pressure of said pump, and means on said hydrostatic snubber within said cavity adapted to engage said body portion and limit the movement of said pump away from said fixed abutment.

6. An integral belt tensioning device and fluid pump comprising a pump having a body portion with a cavity therein in communication with the pump discharge, a drive shaft for said pump rotatably supported in said body portion, a pulley fixed for rotation with said drive shaft, a belt for driving said pulley, means supporting said pump for pivotal movement about an axis spaced from and parallel to said drive shaft, a fixed abutment spaced from the pivot axis of said pump, a bore in said pump body portion communicating with said cavity and terminating adjacent said fixed abutment, a hydrostatic snubber reciprocally received in said bore and having an end portion adapted to engage said abutment for pivotally moving said pump to change the tension on said belt with variations in the discharge pressure of said pump, and motion limiting means affixed to said hydrostatic snubber adjacent said fixed abutment for limiting the movement of said pump toward said abutment by contact with said body portion.

7. A belt tensioning device in the fluid pump comprising a pump having a drive shaft, a pulley affixed for rotation with said drive shaft, a belt for driving said pulley, means supporting said pump for pivotal movement about an axis parallel to and spaced from the axis of said drive shaft, a fixed abutment spaced from the pivot axis of said pump, and a hydrostatic snubber having a first portion in engagement with said abutment and a second portion, pressure transmitting means for transmitting at least a portion of the output pressure of said pump to said second portion for pivotally moving said pump to change the tension on said belt, said hydrostatic snubber including damping means for absorbing the forces generated by sudden increases in pump output, said damping means comprising resilient means interposed between said first and said second portions.

8. An integral belt tensioning device and fluid pump comprising a pump having a body portion with a cavity therein in communication with the pump discharge, a drive shaft for said pump rotatably supported in said body portion, a pulley fixed for rotation with said drive shaft, a belt for driving said pulley, means supporting said pump for pivotal movement about an axis spaced from and parallel to said drive shaft, a fixed abutment spaced from the pivot axis of said pump, a bore in said pump body portion communicating with said cavity and terminating adjacent said fixed abutment, and a hydrostatic snubber comprising a first part reciprocally received in said bore, a second part adapted to engage said abutment, and resilient damping means interposed between said first and said second parts for absorbing the forces exerted by sudden changes in the discharge pressure of said pump.

9. An integral belt tensioning device and fluid pump comprising a pump having a body portion with a cavity therein in communication with the pump discharge, a drive shaft for said pump rotatably supported in said body portion, a pulley fixed for rotation with said drive shaft, a belt for driving said pulley, means supporting said pump for pivotal movement about an axis spaced from and parallel to said drive shaft, a fixed abutment spaced from the pivot axis of said pump, a bore in said pump body portion communicating with said cavity and terminating adjacent said fixed abutment, a hydrostatic snubber reciprocally received in said bore and having an end portion adapted to engage said abutment for pivotally moving said pump to change the tension on said belt with variation in the discharge pressure of said pump, said hydrostatic snubber comprising first and second telescoped cup-shaped members and resilient means interposed between said cup-shaped member for absorbing sudden increases in the discharge pressure of said pump.

10. An integral belt tensioning device and fluid pump comprising a pump having a body portion with a cavity therein in communication with the pump discharge, a drive shaft for said pump rotatably supported in said body portion, a pulley fixed for rotation with said drive shaft, a belt for driving said pulley, means supporting said pump for pivotal movement about an axis spaced from and parallel to said drive shaft, a fixed abutment spaced from the pivot axis of said pump, a bore in said pump body portion communicating with said cavity and terminating adjacent said fixed abutment, and a hydrostatic snubber comprising a first part reciprocally received in said bore, a second part adapted to engage said abutment and coil spring means interposed between said first and said second parts for absorbing sudden changes in the discharge pressure of said pump.

11. An integral belt tensioning device and fluid pump comprising a pump having a body portion with a cavity therein in communication with the pump discharge, a drive shaft for said pump rotatably supported in said body portion, a pulley fixed for rotation with said drive shaft, a belt for driving said pulley, means supporting said pump for pivotal movement about an axis parallel to and spaced from said drive shaft, a fixed abutment spaced from the pivot axis of said pump, a bore in said pump body portion communicating with said cavity and terminating adjacent said fixed abutment, and a hydrostatic snubber comprising a first part reciprocally received in said bore, a second part adapted to engage said abutment and elastomeric means interposed between said first and said second parts of said hydrostatic snubber for absorbing sudden changes in the discharge pressure of said pump.

References Cited in the file of this patent

UNITED STATES PATENTS

| | | |
|---|---|---|
| 600,841 | Oderman | Mar. 15, 1898 |
| 665,448 | Lapman | Jan. 8, 1901 |
| 1,350,551 | Jewell | Aug. 24, 1920 |
| 1,730,319 | Dilks | Oct. 1, 1929 |
| 2,221,585 | Klein et al. | Nov. 12, 1940 |
| 2,310,081 | Hill | Feb. 2, 1943 |
| 2,456,088 | Scircle | Dec. 14, 1948 |
| 2,736,207 | Leifer | Feb. 28, 1956 |
| 2,896,937 | Miller | July 28, 1959 |
| 3,018,667 | Spietz | Jan. 30, 1962 |
| 3,039,757 | Barr | June 19, 1962 |

FOREIGN PATENTS

| | | |
|---|---|---|
| 279,415 | Switzerland | Mar. 1, 1952 |
| 474,889 | Italy | Oct. 3, 1952 |
| 740,164 | Great Britain | Nov. 9, 1955 |